Aug. 8, 1944.  W. H. GREEN  2,355,069
LIQUID TREATING APPARATUS AND PROCESS
Filed Aug. 13, 1941  4 Sheets-Sheet 4
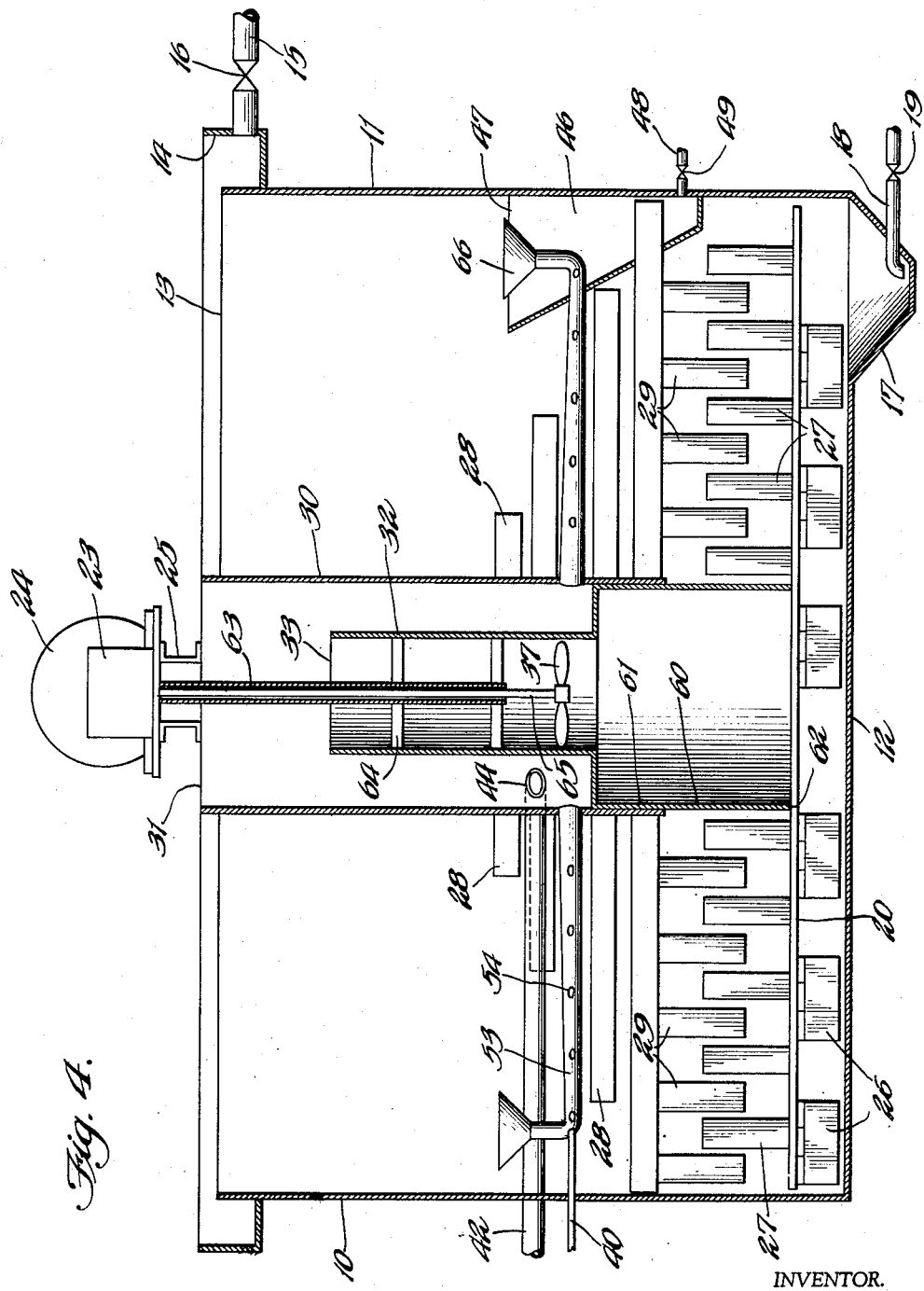
INVENTOR.
Walter H. Green
BY
Robyn Wilcox
ATTY.

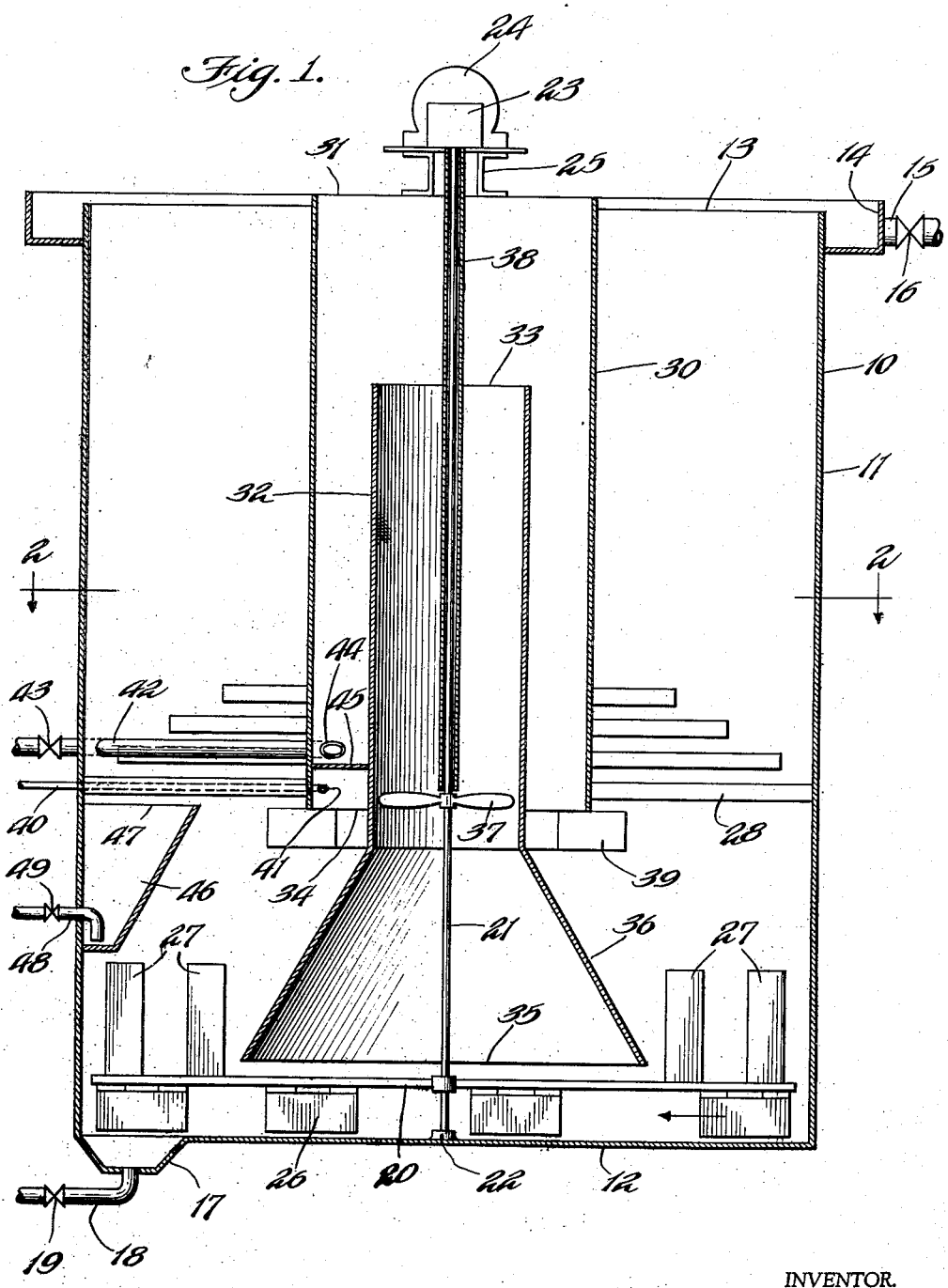

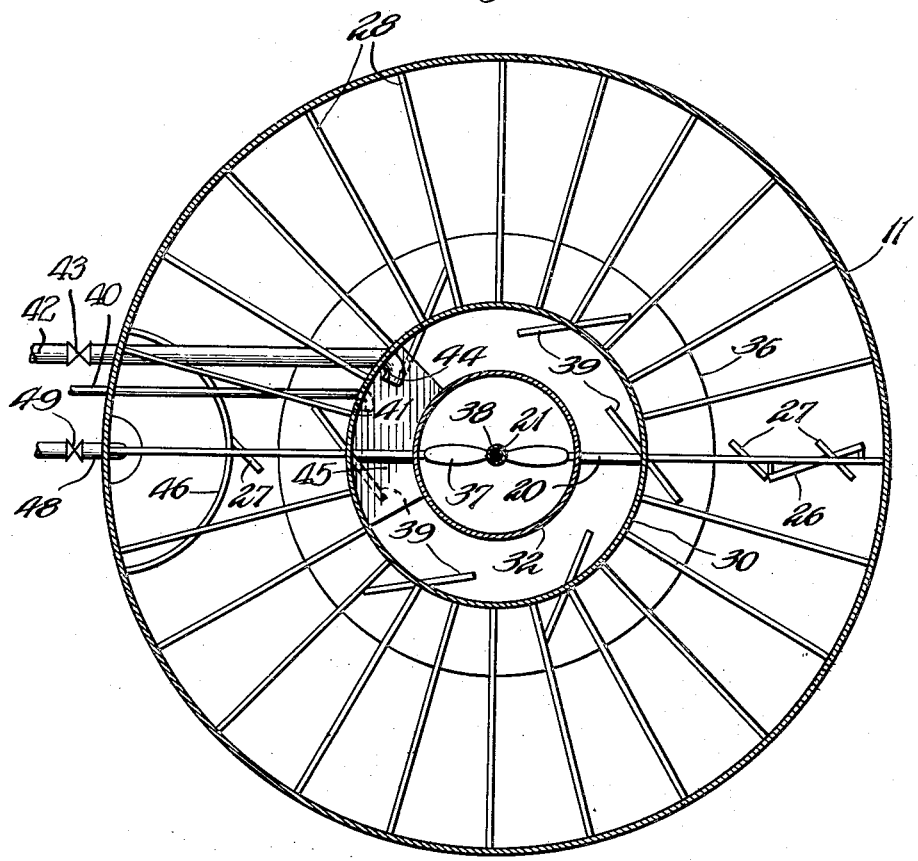

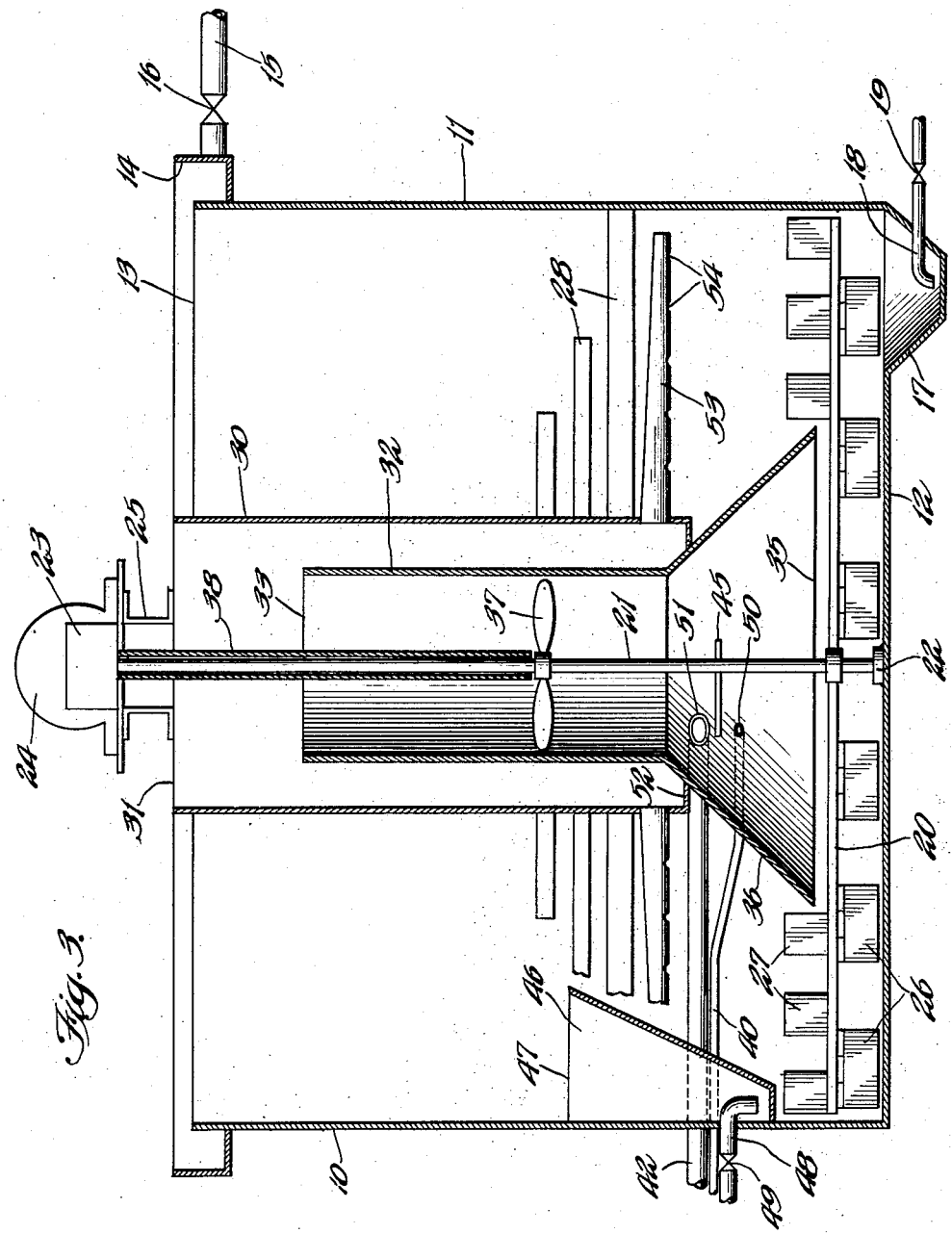

Patented Aug. 8, 1944

2,355,069

UNITED STATES PATENT OFFICE 2,355,069

LIQUID TREATING APPARATUS AND PROCESS

Walter H. Green, Chicago, Ill., assignor to Infilco Incorporated, a corporation of Delaware Application August 13, 1941, Serial No. 406,594

20 Claims. (Cl. 210—16)

This invention has to do with the treatment of liquids and is particularly directed toward the treatment of water to prepare it for use and to the treatment of used water to recover some value or to facilitate disposal.

A general purpose of my invention is to provide an improved method of treatment of the slurry type and improved apparatus whereby a better slurry and improved treating results are obtained, and also to simplify and to effect a reduction in the size of apparatus required to treat a certain quantity of water. In my present apparatus and treatment I make use of a slurry containing a substantial amount of suspended solids, some of which solids are retained from previously treated water, and some of which may have been added as reagent. The use of such a slurry is not in itself new, but I propose a new way of maintaining and utilizing such a slurry.

A particular object of my invention is to effect improvement on the process and apparatus disclosed in my application which has resulted in Patent No. 2,245,583.

In the apparatus and process of the patent referred to the water and treating reagent were admitted directly into the general volume of slurry in the bottom of the tank, preferably separately in a small slurry conduit in which a certain degree of mixing was obtained. Thereafter the water with reagents was simply given a general stirring sufficient to maintain solids in suspension and during the period of such stirring the water and reagents would gradually become completely mixed. From the lower part of the tank the water undergoing treatment gradually rose by displacement through the suspension to be finally taken off at the top.

I have found that the small preliminary mixing contemplated in that patent followed by the slow general mixing is not adapted to the best treatment, and I now propose improvements to overcome some of the difficulties inherent in a treatment carried out as heretofore proposed. For one thing I have found that it is very desirable to promptly secure a complete and thorough mixing of the liquid undergoing treatment and the treating reagent both with each other and with a substantial volume of the slurry, and that this mixing be effected and the mixture retained in an enclosed space of sufficient size so that not only the thorough mixing can be obtained, but also that the resulting reactions be very largely completed therein. In other words, I have found that instead of the mixing and reactions being diffuse and taking place over a long period it is better that this be accomplished more rapidly. There appears to be both a minimum and a maximum desirable proportion or relative volume between the newly entering water to be treated and the slurry with which that water is mixed, and in which it is treated and wherein the major portion of the reactions takes place. These proportions are not sharply defined. Instead there is a considerable range over which results are about the same. Apparently, it is not merely a question of volume of liquid but also of amount of old solids present and new solids entering as such or which are formed by reaction. What appears to be fundamental is that any chemical reaction be somewhat diffuse but not too diffuse. To put much the same idea in another way, there should be a minimum amount of old solids present, or of old solids surface, relative to the amount of new solids entering or being formed, but not too great a proportion. If the desirable range be exceeded on either side the result is a poorer slurry. By poorer slurry is meant one in which the particles present are not suitable to good operation.

The general result of too diffuse reaction is the tendency to produce or maintain a large number of smaller and also more fragile particles with the result that clarification is poor and turbid water will be obtained unless the rising rate is kept down within the range of ordinary sedimentation and clarification may even then be bad. If the reactions take place in a too small volume or with a too small quantity of old solids present to provide proper surface or surface area, the result is the formation of a large number of new small particles with similar results on the character of the slurry, but there may also be at the same time the formation of some large and heavy particles that settle too readily and diminish the slurry. A satisfactory slurry in such a process cannot be measured alone by its density, that is, by the weight of solids per unit of volume, or obtained by simply retaining any kind of particles in suspension, but is dependent also on the character of the particles present in the slurry and of which the slurry is formed.

It is one of the purposes of this invention and one of the advantages gained by the apparatus and operation thereof, to provide conditions suitable for the obtaining and maintaining of a good slurry. One immediate result of such slurry is that the rate of rise of the water in and through the apparatus is not limited to that at which clarification is to be had by sedimentation, which is of the order of about 1 gallon per square foot per minute. With a proper slurry clear water will rise out of the slurry surface at rates substantially higher than this, several times greater in fact. While, as noted above, there is no sharply defined limitation as to the proper proportion of slurry and water in which reaction should take place, yet I have found that if the mixture is in the ratio of about two volumes of the slurry to one volume of water results will be satisfactory unless because of some wrong or unusual condition elsewhere. This mixture should ordinarily be retained in the mixing chamber or space for a period of at least about one minute before being discharged into the general space, but there appears to be no harm in prolonging this period.

I have found also that in addition to the rotary general agitation by which the suspension is maintained and mixing secured it is desirable to have a further circulation. In apparatus of this kind, as heretofore proposed, the water is kept in a horizontal rotary motion and the newly added water slowly displaces previous water upward through the slurry which is more or less stratified, the treated water finally emerging above. I have found that this does not maintain the best condition of, and in, the suspension or slurry, apparently because of the stratification that results and probably for other reasons also. I have found it advantageous to create what may be spoken of as a secondary circulation by which there is a vertical circulation through at least a certain lower portion of the slurry. I have found that this not only secures a better character of slurry, but that this slurry is more uniform in its nature, particularly in the lower part thereof. I have also found that the water undergoing treatment is more uniformly diffused throughout and more intimately mixed with the slurry, and that the treated water rises from the slurry at a more uniform rate. As a result of these things and because of the conditions under which the initial precipitation takes place and of the more thorough and uniform and longer contact of the water with the solids in the slurry, better results from the treatment are obtained.

Preferred embodiments of the present invention are shown in the accompanying drawings, which form a part of this specification and in which like reference characters in the several figures designate similar elements. To a certain extent the apparatus shown herein is similar to that of the patent referred to, but is added to and modified in substantial ways in order to carry out the treatment in a way I have found to be advantageous and to secure the improved results I have found to be possible.

Figure 1 is a vertical section of one embodiment of my invention.

Figure 2 is a plan view of the apparatus of Figure 1 taken along the plane 2—2 of Figure 1.

Figure 3 is a vertical sectional view illustrating another form of apparatus for carrying out my invention.

Figure 4 is a vertical sectional view of still another form of apparatus of my invention.

The apparatus herein proposed for carrying out treatment, as shown in Figures 1 and 2, comprises a main tank or basin, 10. As shown, and preferably, this tank, 10, comprises a cylindrical side wall, 11, and a flat bottom, 12, but it may be polygonal with vertical side walls or it may be in the form of a frustum of a cone or pyramid. A treated liquid withdrawal means is located adjacent the upper rim, 13, of the tank. This withdrawal means may comprise an overflow launder, 14, to which is connected an effluent conduit, 15, provided with a valve, 16. I may also provide a means for draining the tank, 10, such as a sump, 17, connected to a waste line, 18, which is provided with a valve, 19. As shown, this sump is adjacent the wall of the tank, but it can be in any desired radial position. The purpose of this sump or pit is to receive for discharge the heavier particles such as sand or the like which may enter with the raw water or the heavier particles formed in the treatment. These will to some extent be moved along the floor by currents of water due to the agitation, but the agitating vanes hereafter described can also be utilized to move anything that tends to remain deposited on the floor of the tank.

In the bottom of the tank, 10, there is a horizontal agitator bar, 20, which is shown supported from and adapted to be rotated by a shaft, 21. The lower end of the shaft, 21, is journaled in a bearing, 22, in the floor, 12, of the tank, and the upper end is connected to a speed reducer, 23, which in turn is driven by a motor, 24. The motor, 24, and the speed reducer, 23, are supported above the tank, 10, by any suitable means, such as beams, 25. From the agitator bar, 20, there are flexibly suspended a number of vanes or paddles, 26, and from the top of the bar extend upwardly additional agitator vanes, 27, which are rigidly attached to the bar. Inasmuch as during periods of shutdown the solids in suspension will deposit on the floor of the tank, the agitator bar, 20, is preferably some distance above the floor, 12, of the tank, as for instance, about a foot, so that it will not become embedded and put undue load on the motor, 24, in starting up. In order to resuspend material below the bar, 20, and to provide agitation in this space the lower vanes, 26, are provided. These lower vanes, 26, are flexibly attached to the bar so that on starting up again after shutdown they will trail back and pull out of any deposited sediment without undue load on the motor. Thereafter, by the combined effect of their dragging and agitating action they will resuspend the settled solids. Desirably these lower vanes, 26, are set at an angle with the agitator bar, 20, as this facilitates resuspension of the solids and by proper inclination there may be effected a reduction in the tendency to cause an undue outward flow of liquid along the floor of the tank. Similarly the upper agitator vanes, 27, which may be of any desired length and of suitable width, may be set at an angle to the radius for a similar reason. While a comparatively large vane surface is desirable in order to secure the necessary degree of agitation to maintain the suspension, the rotation of such vanes tends to have a pumping effect and produce an outward flow of liquid. This is not undesirable up to a certain point, but if too great produces a violent upward flow of liquid along the wall, 11, of the tank, which carries incompletely treated liquid to the top of the slurry and may result in turbid water. Because of this tendency it has heretofore been found necessary to keep the peripheral velocity of agitator bars down to a minimum that is too low for efficient agitation. By setting the agitating vanes at an angle this flow tendency can be reduced and so higher rotational and agitative velocities utilized. It is, of course, possible by placing more or less horizontal baffles around the wall of the tank to reduce or deflect the upward flow from along the wall, but such baffles are for various reasons undesirable.

I place a plurality of radial, vertical, horizontally extending baffles, 28, in the tank above the agitator, 20, in order to reduce the rotation of liquid in the tank, 10, thereby providing a quiescent zone in the upper portion of the tank. These stilling baffles, 28, as shown, extend across the basin from the outer wall of the mixing chamber to the wall, 11, of the tank. They are desirably located a substantial distance above the floor of the tank so as to provide ample space for agitation below them. They are normally placed radially and horizontally and at such annular spacing as may be suitable in connection with the diameter of the tank as to effectively still the rotary motion due to the agitators. Heretofore such baffles have commonly been made in the form of a solid vane of suitable width placed vertically. I have found that it is much better to make such baffles in the form of a plurality of relatively narrow bars or vanes spaced apart so that some flow can take place between them. This spacing may be vertical or horizontal, or both. If a plurality of narrow baffles are in the same vertical plane there should be space between adjacent edges. If the baffles are fanned out somewhat horizontally there is desirably, but not necessarily, such a vertical spacing. The advantage of this construction is that the rotational motion is, so to speak, gradually stopped and there is not the tendency to form or deflect an upward flow, which may be quite strong, as will occur with a wide baffle when the rotating stream hits the lower part of such baffle. While such an upward flow may tend to form when the rotational stream hits the lower of a plurality of narrow baffles it is relatively feeble and is not forced to go upwardly to the top of the baffling effect, but can escape horizontally through the spaces between the bars or vanes, and thus the tendency of such an upward flow to cause turbid liquid is overcome. In the figures the baffles, 28, are shown some distance above the agitator, 20, and, in general, it is desirable to have these at such an elevation in order that the agitation due to the rotation of the paddles may extend upward as far as possible. It may, however, be found desirable in some cases, and more particularly so in tanks of large diameter, to place the lowermost baffle, 28, as shown in Figure 4, just above the upper agitator vanes, 27, and from this baffle to extend downwardly between the upper agitator vanes some corresponding baffle vanes, 29, and to set these vanes not radially but at an angle to deflect the currents resulting from the rotation of the agitators in a desired direction.

In the apparatus shown in Figure 1 there is a cylindrical structure forming a mixing and reaction chamber or zone, the inlet and outlet of which both communicate with the rotational agitation zone below the stilling baffles, 28. The mixing zone can be of many designs, but I prefer one formed by an outer cylinder, 30, extending above the liquid level in the tank, as at 31, and suspended from the beams, 25, by any suitable means, not shown, and an inner cylinder, 32, held in spaced concentric relationship to the outer cylinder, 30. The upper end, 33, of the inner cylinder, 32, terminates below the water level, 13, of the tank. The lower end, 34, of the outer cylinder, 30, preferably will terminate at approximately the level of the lowermost of the stilling baffles, 28. The inner cylinder will preferably extend downwardly below the outer cylinder, 30, to a level, 35, adjacent the agitator bar, 20. The lower portion of the inner cylinder, 32, may flare, as shown in Figures 1 and 3, to form a truncated cone, 36, or may be cylindrical, as shown in Figure 4. One communication between this mixing zone and the agitation zone in the lower portion of the tank is through the lower end, 35, of the inner cylinder, 32, and the other is through the lower end, 34, of the outer cylinder.

I place a stream impelling means, such as impeller, 37, within the mixing zone formed by the two cylinders. This impeller may be affixed to the shaft, 21, to which the agitator arm, 20, is also attached. In this manner both the impeller, 37, and the agitator, 20, will be driven by one motor, 24, although obviously separate motors could be used. I prefer to have a small cylinder, 38, surrounding the shaft, 21, above the level of the impeller.

It is desired that water to be treated and the reactant be introduced to the slurry in the mixing zone. Figure 1 is adapted to provide a flow upwardly in the outer cylinder, 30, and downwardly in the inner cylinder, 32. Thus, the inlet to the mixing zone is the lower end, 34, of the outer cylinder and the outlet is the lower end, 35, of the inner cylinder. I prefer to impart rotational agitation to the slurry as it enters the mixing zone, and for this purpose I provide a plurality of baffles, 39, in the inlet to the mixing zone, set at an angle to the radius of the cylinder, 30. I prefer to separately introduce the chemical reactant and the water to be treated to the slurry, and prefer that the reactant be first mixed with the slurry. To this end, I propose to introduce the reactant through a chemical line, 40, discharging tangentially, as at 41, in the lower part of the outer cylinder. A slight distance above the chemical inlet, 41, the raw water conduit, 42, which may be provided with a regulating valve, 43, discharges, preferably tangentially, as at 44, into the mixing zone. I prefer to place a shelf, 45, below the raw water inlet, 44, in order to prevent such water from flowing out the lower end, 34, of the outer cylinder.

I prefer to withdraw excess solids from adjacent the upper level of the zone of rotational agitation. In this connection I prefer to use a solids collecting pocket, 46, the upper edge, 47, of which may be placed at a level adjacent the lowermost stilling baffle, 28, as shown in Figure 1, or the uppermost stilling baffle, as shown in Figure 4, or intermediate the two, as shown in Figure 3. A waste or solids withdrawal line, 48, provided with a regulating valve, 49, leads from the lower part of the solids collecting pocket, 46. The top edge, 47, should be at about the normal level of the slurry in the apparatus during operation. During operation solids in slurry rising above the top edge of this chamber will flow over the chamber and subside therein and may then be discharged as desired through the outlet, 48, controlled either manually or automatically by the valve, 49. In this way the solids may be removed at substantially the rate of entry or formation and the upper level of the slurry may be maintained at the desired elevation.

The operation of the apparatus shown in Figure 1 will be understood very readily. As operation of the apparatus commences, the motor, 24, will be started, thereby rotating the impeller, 37, and the agitator, 20. The latter imparts a turbulent rotation to the water in the tank below the level of the stilling baffles, 28. The impeller, 37, imparts a high velocity circulation through the mixing zone from the inlet, which is the open end, 34, of the outer cylinder, 30, upwardly through the outer cylinder, 30, over the upper end, 33, of the inner cylinder, 32, downwardly through the inner cylinder, 32, and out at the lower end, 35, of the latter. Water to be treated and chemical reagent are introduced to the circulating slurry in the mixing zone, as at 44 and 41, respectively. I have found that very good results are secured when the size of the mixing cylinders and the speed of the impeller are such as to require a period of not less than one minute for complete displacement of liquid within the mixing zone. I have also found that the definite vertical circulation imparted in the mixing cylinders, which is imposed upon rotational agitation in the circulation zone below the stilling baffles, and the taking of slurry from one level of said circulation zone and its discharge at a widely separated level provides a slurry which is often superior to that secured in the process and apparatus of my above mentioned patent. Similar results can be secured if the flow through the mixing zone is reversed as shown in Figure 3, in which event the raw water conduit and reagent conduit discharge into the inner cylinder, 32, and the impeller, 37, is set to provide an upward flow instead of a downward.

The embodiment shown in Figure 3 is similar to that shown in Figures 1 and 2 except for three features: First, the direction of the vertical flow is reversed. In this embodiment the inlet to the mixing zone is at the lower end, 35, of the inner cylinder, 32, and the outlet is from the lower part of the outer cylinder, 30. Thus, the inlet is adjacent the agitator and the outlet is adjacent the top of the slurry zone, or zone of rotational agitation. This requires that the chemical conduit, 40, discharge into the inner cylinder, 32, and preferably tangentially in the lower portion thereof, as at 50. Likewise, the raw water conduit, 42, will discharge into the inner cylinder, 32, preferably, as at 51, above the chemical inlet.

Secondly, I may close the lower end of the outer cylinder, as shown at 52. I then provide a plurality of horizontal flow members, 53, extending from adjacent the lower end of the outer cylinder, 30. The flow members extend out horizontally across the basin. These horizontally extending pipes are provided with openings, as shown at 54, which may be of such size and spacing as to discharge substantially evenly radially in proportion to the area of the tank. These flow members, 53, are particularly adapted for large diameter tanks, as they provide for the uniform distribution of slurry, and in a large tank a discharge from the open lower end of the outer cylinder would not.

Thirdly, the solids receiving pocket has been raised so that the upper level, 47, is between the top and bottom stilling baffles. In apparatus of the type adapted to use a slurry, I have found that it is desirable to have the upper edge of the solids receiving pocket adjacent the upper level of the slurry zone, or adjacent the "slurry interface" as the demarcation between the turbid slurry and clear water is sometimes called. This level may be maintained at any desired point between the lower edge of the lower-most stilling baffle and the upper edge of the highest of such baffles.

The apparatus shown in Figure 4 differs somewhat from those shown in the other figures although essentially it is the same, for the process is identical in all three embodiments. In the embodiment of this figure the tank structure, the stilling baffles, the agitator bar, and the outer cylinder are the same as in the other embodiments. The inner cylinder, 32, is provided with a bottom section, 60, that fits snugly within the outer cylinder, 30, for a considerable distance, as at 61, at the bottom end of the latter, in order to provide a substantially water tight joint at that point but one that will permit rapid rotation of the inner cylinder. As shown, the agitator bar, 28, which is of the same construction as in the other figures, is attached to and supported by the inner cylinder, 32, as at 62. The inner cylinder, 32, is in turn attached to a quill shaft, 63, by any suitable means, such as braces, 64, and is rotated by the motor, 24, and speed reducer, 23. This quill shaft, 63, is, of course, hollow and through it extends another shaft, 65, which may be suitably rotated either by the same motor or otherwise and on the lower end of this shaft is an impeller, 37, or other stream producing device, to cause a circulation of water in the inner chamber. This circulation can be upward but is desirably downward so that circulating water will be delivered adjacent the floor of the tank. The raw water is admitted through a pipe, 42, which is shown to discharge tangentially, as at 44, within the annular space between the walls of the inner and outer cylinders, 32 and 30. The water from this inlet pipe preferably enters this inlet space a short distance above the bottom thereof. Entering the chamber defined by the walls of the inner and outer cylinders, 32 and 30, and preferably below the raw water inlet, 44, is a plurality of horizontal flow members, 53, provided with a plurality of openings, 54, so that slurry from all portions of the tank can be brought into the mixing zone. Chemical reagent may be introduced through a chemical feed line, 40, discharging into this chamber as in the other figures or can be introduced into one or more of the horizontal flow members, 53, as shown in this figure. In either event, it is my desire that the slurry and chemical reagent be well mixed within the annular space close to the bottom thereof. The reagent should be more or less mixed with the heavy slurry before this reaches the level of the incoming raw water, thereby providing that the mixing of the reagent with the raw water, and the reactions which take place thereby, will occur in the presence of a substantial amount of suspended solids. This is desirable as in this way fewer new light particles are formed and at the same time the older particles are reinforced and to an extent are cemented together. By such an action a very much more rugged type of particle is obtained and the slurry formed is of such a nature that it can be subjected to much more violent agitation.

There may extend upwardly from one or more of the horizontal flow members a funnel shaped inlet, 66, thereto. The top edge of this funnel, 66, is preferably located at about the normal upper level of slurry within the basin. The radial openings along the pipe may be omitted and all of the slurry drawn in through these funnel openings, the tops of which have the effect of a skimming action, and so draw back into the circulation lighter particles which may tend to accumulate adjacent the upper level of the slurry. Such a skimming action, while of use in some cases, is not in general necessary because such lighter solids are not formed to any great extent in the normal operation of the apparatus due to the way the treatment is carried out and the major part of the precipitation caused to take place as referred to. Any small amount of such light particles would normally be removed by the skimming action of the slurry concentrator hereinbefore referred to.

As mentioned above, the vertical circulation in any of the embodiments can be reversed in direction. The upward component can be within the central cylinder or space, with a downward flow outside, or vice versa, without affecting the operation of the apparatus. In large tanks, I prefer to use the horizontally extending flow members as they are desirable as means of distributing the flow over, or in collecting incoming slurry from, the area of the tank. They also serve to avoid a too strong flow around the circumference of the central cylinder, as is apt to be the case if the discharge or inlet is merely through an opening or openings in the cylinder wall. Such a strong flow is objectionable if too near the top of the slurry. When these arms are used in this way the flow out from them is preferably directed downwardly or laterally.

The word "substantial" is used herein and in the claims which follow in its usual sense of indicating a considerable or appreciable distance in relation to the size of the tank.

I have shown and described preferred forms of apparatus embodying my invention. Obviously, these can be modified in various ways and the advantages contemplated and set out obtained. Such changes will be advantageous to meet particular conditions and can readily be made by one skilled in the art. The appended claims are intended to cover such modifications so far as may be permissible in the state of the art.

I claim:

1. Water treating apparatus comprising a tank, an agitator in the lower part of said tank mounted for rotation in a horizontal plane, said agitator extending substantially across the floor of said tank, means to rotate said agitator, an upwardly extending partition structure in said tank, separating therein a vertically extending mixing and reaction chamber centrally disposed within said tank above said agitator from a quiescent clear water space in the upper portion of said tank, an inlet opening into said chamber from said tank, an outlet opening from said chamber into said tank, one of said openings being adjacent to the level of said agitator and the other spaced a substantial distance thereabove, a mechanically driven stream projecting impeller within the mixing chamber so constructed and arranged as to cause a flow of liquid through said chamber from said inlet to said outlet, horizontally extending vertical baffle means in said tank between said partition structure and the walls of said tank spaced at a level above said agitator, inlet means for liquid to be treated and a treating reagent discharging into the mixing and reaction chamber, a treated liquid outlet leading from the upper part of said tank and a solids outlet leading from the lower portion of said tank.

2. The apparatus of claim 1 wherein the agitator is provided with vane members extending downwardly therefrom and flexibly attached thereto.

3. The apparatus of claim 1 wherein the agitator is located a sufficient distance above the floor to prevent becoming embedded in sedimented solids and is provided with downwardly extending members flexibly attached thereto.

4. The apparatus of claim 1 wherein the agitator is provided with agitating members attached thereto, which agitating members are set at an angle to the agitator.

5. The apparatus of claim 1 wherein the said baffle means comprises a plurality of relatively narrow vertically spaced horizontally extending baffle members.

6. The apparatus of claim 1 wherein there is at least one horizontal flow member extending outwardly from the upper of said inlet and outlet openings into said tank.

7. The apparatus of claim 1 wherein the solids outlet comprises a pocket within the tank wherein subsidence of solids may take place.

8. The apparatus of claim 1 wherein the outlet for solids leads from a level in the tank a substantial distance above the floor of the tank.

9. Water treating apparatus comprising a tank, a horizontally extending agitator in the lower part of said tank mounted for horizontal rotation therein and so constructed and arranged as to impart mainly rotational circulation to liquid throughout the lower part of said tank, power driven means to rotate said agitator, baffle means in said tank above said agitator to provide a circulation zone therebelow and a quiescent zone thereabove, an upwardly extending partition structure in said tank and forming therein a mixing and reaction chamber, an inlet to said chamber from said circulation zone, an outlet from said chamber to said circulation zone, said inlet and outlet being spaced a substantial vertical distance apart, power driven liquid impelling means adapted to cause a flow of liquid through said chamber from said inlet to said outlet, means to supply liquid to be treated and treating reagent to within said chamber, an outlet for treated liquid from the upper part of said tank, and an outlet for discharge of solids from said tank.

10. In liquid treating apparatus comprising a tank substantially free of obstructions which restrict vertical flow, a treated liquid outlet from the upper portion of the tank, an agitator member rotatably mounted in the lower portion of the tank, and means for stilling rotary motion imparted to liquid in said tank by said agitator comprising substantially vertical baffles extending horizontally across the tank above the agitator member and below the treated liquid outlet, the improvement which comprises a partition structure mounted in said tank and rising vertically from adjacent the level of said agitating member and enclosing a confined mixing zone in said tank, an inlet opening into said mixing zone, an outlet opening from said mixing zone, one of said openings being located adjacent the level of said agitator member and the other a substantial vertical distance thereabove but below the uppermost level of said baffles, power driven liquid impelling means within said mixing zone so constructed and arranged as to cause a substantial flow of liquid from said inlet to said outlet, means for delivering liquid to be treated into the mixing zone, and means for delivering treating reagent into the mixing zone.

11. The apparatus of claim 10 wherein the power driven liquid impelling means is of capacity to cause such flow in amount equal to not less than approximately the amount of incoming water to be treated.

12. The apparatus of claim 10 wherein the power driven liquid impelling means is so constructed and arranged as to provide for the complete displacement of water in said zone in a period of not less than one minute.

13. Apparatus of the type described, comprising a substantially cylindrical tank, a vertically extending partition structure in said tank forming an enclosed mixing and reaction chamber centrally located in said tank, said chamber having an inlet opening from the lower portion of said tank and an outlet opening to the lower portion of said tank, one of said openings being adjacent the floor of said tank and the other spaced a substantial vertical distance thereabove, power driven liquid impelling means to cause flow through said chamber from said inlet to said outlet, means for introducing liquid to be treated to said chamber, means for introducing a reactant to said liquid to be treated, an agitator in said tank and below said mixing chamber, said agitator comprising an arm extending horizontally adjacent the floor of the tank and of a length greater than the diameter of the mixing chamber, power driven means to rotate said agitator, stilling baffle means positioned in said tank above said agitator, a treated liquid outlet from the upper portion of said tank and a waste outlet from an intermediate level in said tank.

14. The apparatus of claim 13 comprising also a solids separator receiving material from within said tank, said waste outlet leading from said separator.

15. In the process of treating water that includes separation of the water and solid particles formed therein in a tank free of obstructions that materially restrict vertical flow, said process comprising the steps of maintaining a body of water undergoing treatment in said tank, delivering water to be treated into the lower portion of said body, accumulating in the said lower portion of said body solids from previously treated water to form a slurry, agitating the slurry in the lower portion of said body to produce a movement having a major rotational component to maintain in suspension substantially all solids therein, stilling the rotational movement of the slurry rising out of the zone of agitation to create a zone of relative quiescence in the upper portion of said body of water, withdrawing solids to waste from the slurry rising in said body of water and withdrawing treated water from said body of water above the level of solids withdrawal, the improvement which comprised establishing a substantial vertical circulation in which rotating slurry is withdrawn from one level in said slurry, passed vertically through a partially confined circulating and mixing zone and returned to said slurry at another level therein, imparting sufficient impelling energy to liquid in said mixing zone to maintain such circulation, and delivering the water to be treated and a chemical reagent into said circulating and mixing zone.

16. The process of claim 15 wherein the solids are withdrawn to waste at a level about that of the top of the slurry.

17. The process of claim 15 wherein solids withdrawn to waste are passed through a zone of subsidence prior to discharge.

18. A process of treating water in a tank which includes separation of water and solid particles comprising the steps of maintaining a body of water undergoing treatment in the tank, establishing in the lower portion of said body of water a zone containing a slurry of suspended solids separated and accumulated from previously treated water, imparting mechanical impelling energy to said slurry to effect a rotary movement of slurry throughout said zone of sufficient velocity to prevent sedimentation of solids from said slurry, passing slurry from one level of said slurry zone through a separated mixing zone and discharging the same back into said slurry zone at another level therein, mixing together in said mixing zone newly entered water, reagent and circulating slurry, imparting additional mechanical impelling energy to slurry in said mixing zone to cause said passing of slurry through said mixing zone and the mixing of said water, reagent and slurry, stilling the rotary movement of the slurry in the upper portion of said slurry zone to form a zone of relative quiescence in the upper portion of said body of water, withdrawing treated water from the upper part of said quiescent zone, and withdrawing solids to waste from a level below said quiescent zone.

19. Water treating apparatus comprising a tank, a partition within said tank dividing the same into a mixing and reaction zone and an outer space, said partition being so constructed and arranged as to form two constantly open passageways between said mixing zone and the lower portion of said outer space, one of said passageways being located adjacent to the floor of said tank and the other spaced a substantial vertical distance thereabove, substantially vertical horizontally extending baffle members in said outer space and dividing the same into an upper quiescent zone and a lower circulating zone, a horizontally extending agitator member in the lower portion of said circulating zone mounted for rotation about a vertical axis, an impeller within the mixing zone adapted to cause a flow of liquid through said zone between said passageways, means for rotating said agitator and said liquid impeller, means to supply liquid to be treated and a treating reagent to within said mixing zone, a liquid withdrawal means in the upper portion of said outer space, and an outlet for discharge of solids from said tank.

20. Water treating apparatus comprising a tank having substantially vertical walls and a floor, an agitator mounted for rotation in a horizontal plane adjacent the floor of said tank, said agitator extending substantially from wall to wall of said tank, means to rotate said agitator, a vertically extending mixing and reaction chamber comprising spaced inner and outer tubular members communicating with each other at their upper end and centrally disposed within the tank above said agitator, an inlet opening from said tank into one of said tubular members, an outlet opening into said tank from the other of said tubular members, one of said openings being adjacent the level of said agitator and the other spaced a substantial distance thereabove, a mechanically driven stream projecting impeller within the mixing chamber so constructed and arranged as to cause a flow of liquid through said chamber from said inlet to said outlet, vertical baffle means in said tank extending horizontally from said outer tubular member to the walls of said tank spaced at a level above said agitator and said inlet and outlet openings, inlet means for liquid to be treated and a treating reagent discharging into the mixing and reaction chamber, a treated liquid outlet leading from the upper part of said tank and a solids outlet leading from the lower portion of said tank.

WALTER H. GREEN.